US009625958B2

(12) United States Patent
Junkins et al.

(10) Patent No.: US 9,625,958 B2
(45) Date of Patent: Apr. 18, 2017

(54) DEFLECTABLE DIVIDERS SEPARATING PERIPHERAL COMPONENTS

(71) Applicant: LENOVO (Singapore) PTE, LTD., New Tech Park (SG)

(72) Inventors: Andrew Thomas Junkins, Cary, NC (US); Paul Artman, Cary, NC (US); Gerard Francis Muenkel, Raleigh, NC (US); Vincent Charles Conzola, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 143 days.

(21) Appl. No.: 14/318,978

(22) Filed: Jun. 30, 2014

(65) Prior Publication Data

US 2015/0382493 A1    Dec. 31, 2015

(51) Int. Cl.
*G06F 1/16* (2006.01)
*H05K 5/00* (2006.01)
*H05K 7/00* (2006.01)
*G06F 1/18* (2006.01)

(52) U.S. Cl.
CPC .................................. *G06F 1/185* (2013.01)

(58) Field of Classification Search
CPC .......... G06F 1/183; G06F 1/184; G06F 1/185; G06F 1/186; G06F 1/187
USPC ....... 361/752, 758, 755, 759, 679.32–679.39
See application file for complete search history.

(56) References Cited

U.S. PATENT DOCUMENTS

| 3,975,805 | A * | 8/1976 | Spurling | F16B 2/18 |
| | | | | 211/41.17 |
| 5,200,882 | A * | 4/1993 | Blomquist | H05K 7/1404 |
| | | | | 211/41.17 |
| 5,883,784 | A * | 3/1999 | Hughes | H05K 7/1404 |
| | | | | 174/16.3 |
| 6,549,398 | B2 * | 4/2003 | Chen | G06F 1/184 |
| | | | | 312/223.1 |
| 6,927,984 | B2 * | 8/2005 | Chen | G06F 1/184 |
| | | | | 361/732 |
| 7,443,666 | B2 * | 10/2008 | Huang | G06F 1/184 |
| | | | | 312/223.1 |
| 7,881,062 | B2 * | 2/2011 | Chen | G06F 1/185 |
| | | | | 361/679.32 |
| 8,009,435 | B2 * | 8/2011 | Metzger | H05K 7/1429 |
| | | | | 361/704 |
| 8,218,308 | B2 * | 7/2012 | Yang | G06F 1/185 |
| | | | | 361/679.32 |

(Continued)

*Primary Examiner* — Anthony Haughton
(74) *Attorney, Agent, or Firm* — Kunzler Law Group (57) ABSTRACT

An apparatus with deflectable dividers separating peripheral components is disclosed. The apparatus includes a shroud housing coupleable to a circuit board of a computer. In an installed position, the shroud housing facilitates a proper electrical connection between peripheral components and the circuit board. The apparatus also includes at least one deflectable divider that is deflectably mounted to the shroud housing. In the installed position, the at least one deflectable divider is disposed between adjacent peripheral components. The at least one deflectable divider is operably displaced away from a selected peripheral component in a displacement motion by fingers of a user during a component swap operation to allow space for the fingers of the user to grasp the selected peripheral component.

20 Claims, 6 Drawing Sheets

(56) References Cited

U.S. PATENT DOCUMENTS 8,902,601 B2 * 12/2014 Trotman .............. H05K 7/1402
361/679.38

* cited by examiner

DEFLECTABLE DIVIDERS SEPARATING PERIPHERAL COMPONENTS

BACKGROUND

Field

The subject matter disclosed herein relates to replacing peripheral components and more particularly to an apparatus that includes deflectable dividers for separating adjacent peripheral components.

Description of the Related Art

Most conventional computers have interfaces that can connect with various peripheral components. For example, peripheral component interconnect ("PCI") connectors have become a standard input/output for many computing platforms. Other devices, such as expansion cards, network cards, modems, and TV tuner cards, are additional examples of peripheral components that can be detached from a circuit board of a computer. However, conventional peripheral components are generally not configured to be repeatedly detached from a circuit board of a computer.

BRIEF SUMMARY

An apparatus with deflectable dividers separating peripheral components is disclosed. The apparatus includes a shroud housing coupleable to a circuit board of a computer. In an installed position, the shroud housing facilitates a proper electrical connection between peripheral components and the circuit board. The apparatus also includes at least one deflectable divider that is deflectably mounted to the shroud housing. In the installed position, the at least one deflectable divider is disposed between adjacent peripheral components. The at least one deflectable divider is operably displaced away from a selected peripheral component in a displacement motion by fingers of a user during a component swap operation to allow space for the fingers of the user to grasp the selected peripheral component.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
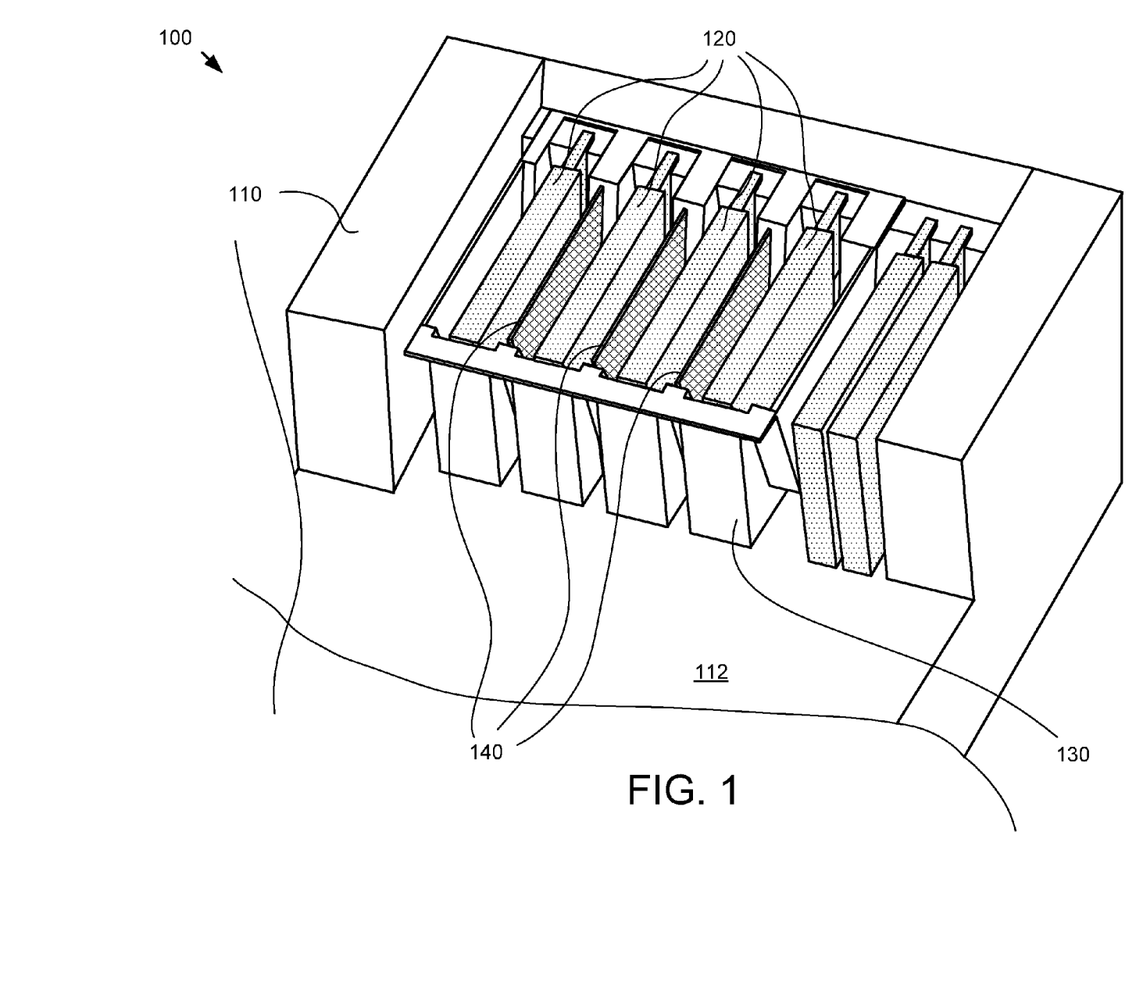
FIG. 1 is a perspective view of one embodiment of a system that includes a computer, a plurality of peripheral components, a shroud housing, and multiple deflectable dividers.

FIG. 1 is a perspective view of one embodiment of a system that includes a computer 110, a plurality of peripheral components 120, a shroud housing 130, and multiple deflectable dividers 140. The term computer 110 is defined herein as any electrical computing device (hardware) that has a circuit board 112 to which peripheral components may be attached. For example, the computer 110 may be a desktop computer, a laptop computer, a mobile computing device, or a server, among others. As depicted in FIG. 1, a plurality of peripheral components 120 are attached to the circuit board 112 of the computer 110.

The term peripheral component 120 is defined herein as any hardware that is detachably electrically connected to the circuit board 112 of the computer 110. In one embodiment, the peripheral components 120 are peripheral component interconnect ("PCI") connectors. Computer central processing units can be connected, using PCI architecture, to hard disk drives, printers, networks, and various other components. PCI technology has evolved by offloading various functions to higher-bandwidth PCI derivatives, including AGP and PCI-X, both of which are PCI variants. A conventional PCI bus, however, does not support features such as advanced power management or quality of service to guarantee bandwidth for real-time operations.

PCI express (formerly "3GIO") has been introduced which uses four wires of two differential pairs to support simultaneous two-way communication. More particularly, PCI express uses a high speed serial link (unlike 32 bit and 64 bit parallel buses) that consists of dual simplex channels, each implemented as a transmit pair and a receive pair for simultaneous transmission in each direction. Each pair consists of two low-voltage, differentially driven pairs of signals. A PCI Express link can be scaled by adding signal pairs to form multiple lanes between two devices, with one bit (×1), four bit (×4), eight bit (×8), and sixteen bit (×16) lane widths being supported.

With that overview of PCI express in mind, the present disclosure recognizes that many peripheral components 120, such as PCI express cards, can support connectors that have (i.e., ×1, ×4, ×8, and ×16) of various sizes. For example, the peripheral components that have comparatively more connectors, such as some video cards that require all 164 connector elements of a PCI connector. In other words, some peripheral components 120 are quite large and require a substantial amount of space within the computer. This problem is further compounded when multiple peripheral component 120 connection slots are desired on a single circuit board 112. While one solution is to shrink the size of cards down and place them close together, peripheral components 120 need to still be replaceable/detachable. In other words, two constraints are generally placed on the configuration of computers 110 with peripheral component 120 architecture. First, a high peripheral component density (i.e., the pitch of peripheral components across the surface of a circuit board 112) is beneficial in order to decrease the form factor of the computer 110. Second, the peripheral component density can't be too high so as to preclude a user from being able to detach a selected peripheral component from the circuit board 112. The present disclosure pertains to this competing constraints issue.

The depicted shroud housing 130 is a structure that physically supports the attached peripheral components 120 and facilitates the successful electrical connection between the circuit board 112 and the peripheral components 120. Additional details relating to the shroud housing are included below with reference to FIGS. 2-5. Mounted to the shroud housing 130 is at least one deflectable divider 140. The shroud housing 130 and the at least one deflectable divider 140 do not have to be separate components. In other words, although throughout the disclosure the dividers 140 are referred to as being "mounted to" the shroud housing 130, it is expected that the shroud housing 130 and the dividers 140 may be substantially integrated and may appear and function as a single assembly instead two separate assemblies mounted together.

As described in greater detail below with reference to FIGS. 2-6, the at least one deflectable divider 140 can be deflected by a user's fingers upon grasping a selected peripheral component for removal or installation. In other words, the deflectable dividers 140 can be deflected in a displacement motion to make room a user's fingers. The deflectable nature of the dividers 140 allows for the plurality of peripheral components 120 to be placed comparatively closer together (increasing component density) while still allowing a user to grasp and detach the peripheral components 120. In one embodiment, each and every divider between adjacent peripheral components 120 may not deflect. For example, in one implementation every other divider is deflectable.

Figure 2:
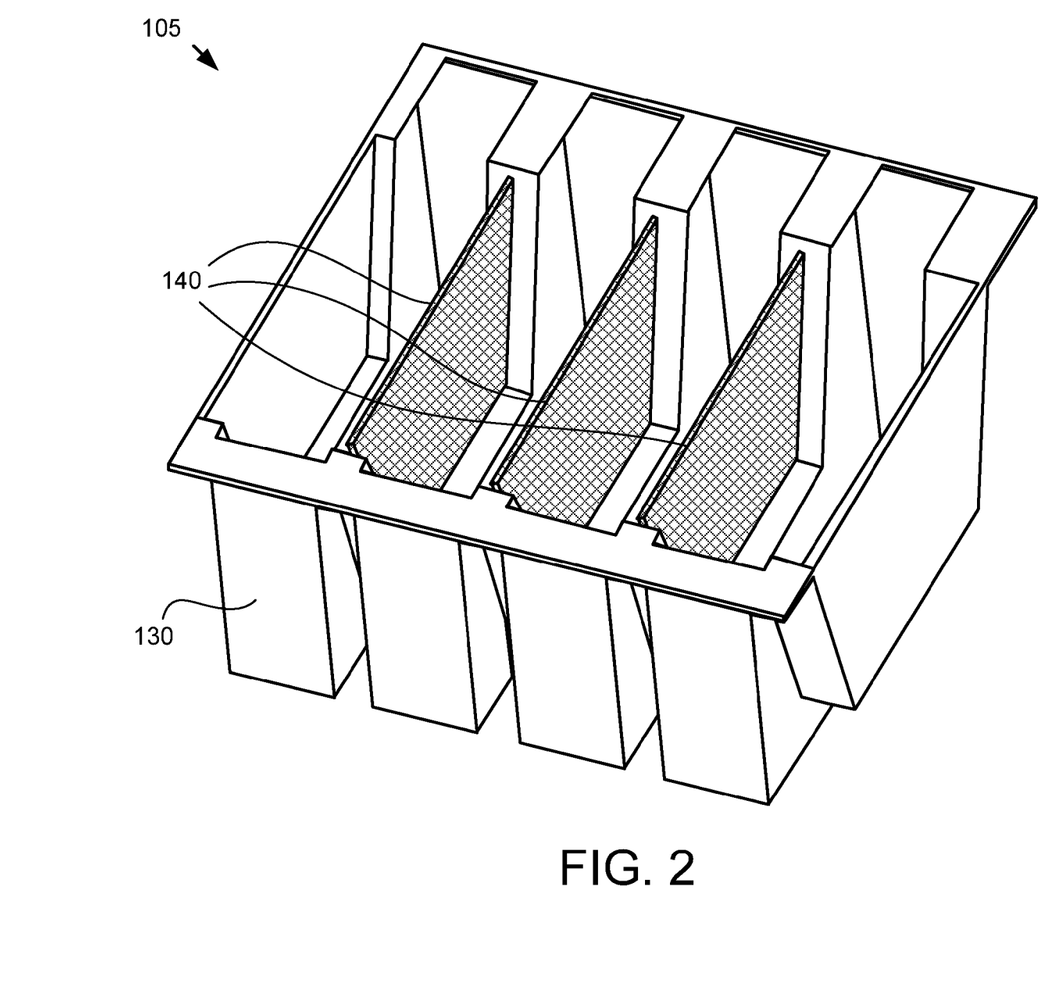
FIG. 2 is a perspective view of one embodiment of an apparatus that includes a shroud housing and multiple deflectable dividers.

FIG. 2 is a perspective view of one embodiment of an apparatus 105 that includes a shroud housing 130 and multiple deflectable dividers 140. FIG. 2 shows the housing 130 and associated deflectable dividers 140 removed from the computer 110. In one embodiment, the apparatus 105 is an assembly that is independent from the computer 110 and may be selectively attached/mounted to the circuit board. For example, the apparatus 105 may be retrofitted to fit an existing computer 110. In another embodiment, however, the apparatus 105 that includes the shroud housing 130 and the deflectable dividers 140 may be integrated with a computer 110 as an original component manufacture.

The shroud housing 130 and the deflectable dividers 140 generally provide structure and physically support the peripheral components 120. For example, computers 110 often undergo a series of "shock and vibe" tests to ensure that the hardware of the computer can withstand the anticipated or expected use. Accordingly, the shroud housing 130 mounts to the computer 110 and partially surrounds and supports the peripheral components 120 to reduce the strain and torque placed on the electrical connectors. Further, the shroud housing 130 can include guiding surfaces that facilitate the proper alignment of the corresponding electrical traces on the peripheral components 120 and the circuit board 112.

The shroud housing 130 may include fastener elements (not depicted) that facilitate mounting the shroud housing 130 to the computer 110. Further, the shroud housing 130 may include indicator lights and switches (not depicted) for identifying and selecting, respectively, which peripheral component connector slots are electrically active/live on the circuit board 112.

The deflectable dividers 140, though described in greater detail below, are coupled to the shroud housing 130 and are configured to undergo a controlled displacement motion. The shroud housing 130 and the deflectable dividers 140 may be constructed of various materials, such as plastic, composite, rubber, ceramic, etc. Depending on the specifics of a given application, the deflectable dividers 140 may be have protective features that prevent or at least lessen the impact of the deflectable dividers on surrounding peripheral components 120. In another embodiment, the dividers 140 may include electrically insulating features to prevent a deflecting divider 140 from electrically shorting an adjacent peripheral component.

In one embodiment, the present disclosure can be used to implement a "hot-swap" operation. "Hot-swapping" is generally defined as replacing peripheral components while the circuit board 112 is still electrically active. In other words, the peripheral components 120 can be switched out without having to shut-down the computer 110. For example, a user may electrically deactivate (e.g., disconnect, through the use of a manual switch) a single set of peripheral component connectors 114 (see FIG. 3), thus electrically deactivating a selected peripheral component and allowing a user to manually remove the selected peripheral component.

Figure 3:
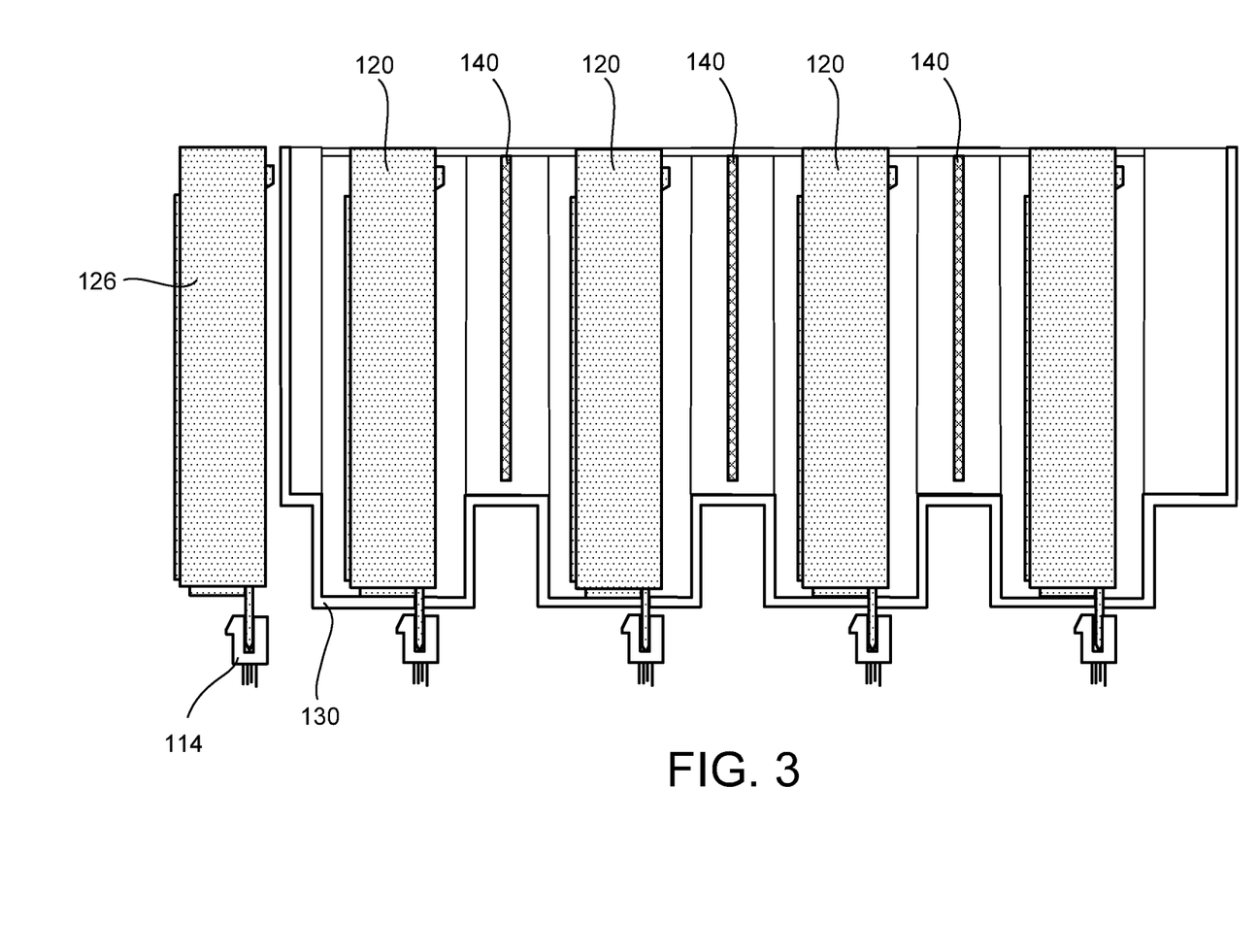
FIG. 3 is a cross-sectional side view of one embodiment of a system that includes electrical connectors, a plurality of peripheral components, a shroud housing, and multiple deflectable dividers.

FIG. 3 is a cross-sectional side view of one embodiment of a system that includes electrical connectors 114, a plurality of peripheral components 120, a shroud housing 130, and multiple deflectable dividers 140. The plurality of peripheral components 120 are partially enclosed within the shroud housing 130. As depicted, the computer system may include other peripheral components 126 that are external to the shroud housing 130. In other words, in one embodiment, the shroud housing 130 and the deflectable dividers 140 of the present disclosure are not implemented in conjunction with all of the peripheral components attached to the computer.

FIG. 3 also depicts various electrical connectors 114 with which the peripheral components 120 are electrically engaged. According to one embodiment, these electrical connectors 114 may be embedded/integrated with the circuit board 112 of the computer 110. In another embodiment, electrical connectors 114 may be retrofitted extender cables that electrically connect peripheral components that are removed a distance from the circuit board 112.

Figure 4:
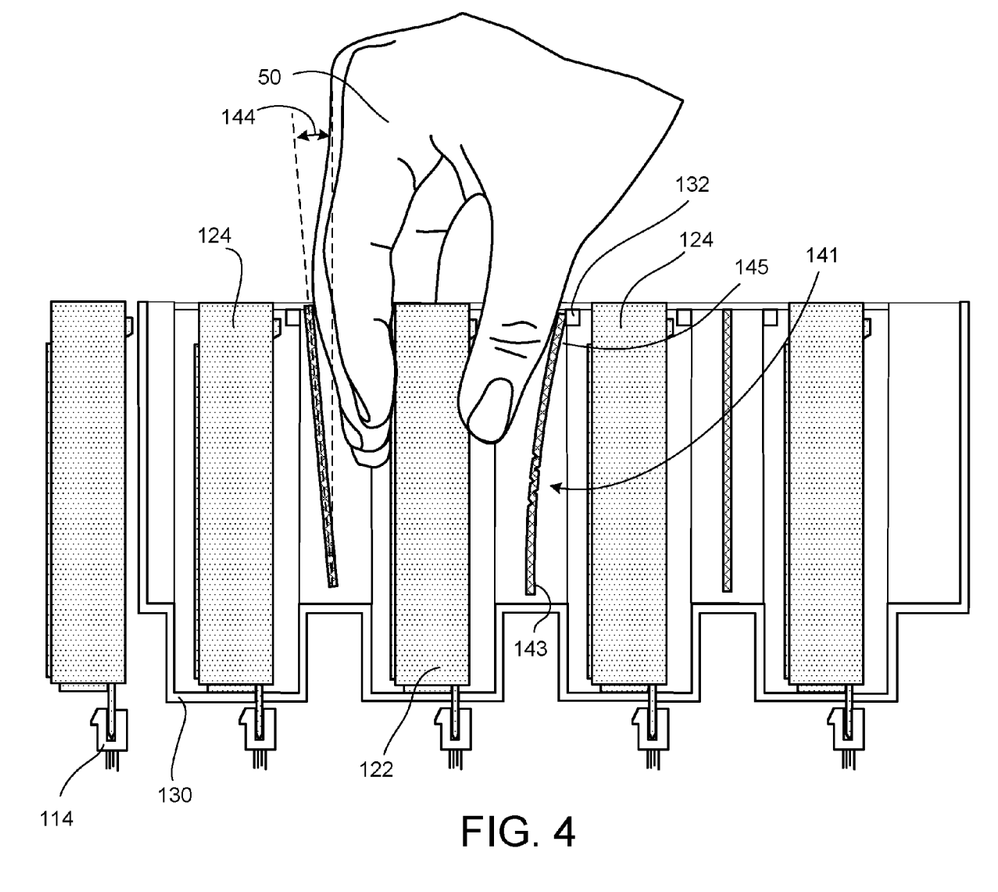
FIG. 4 is a cross-sectional side view of one embodiment of a hand of a user grasping a selected peripheral component during a component swap operation, with the deflectable dividers moving in a pivoting-type motion.

FIG. 4 is a cross-sectional side view of one embodiment of fingers 50 of a user grasping a selected peripheral component 122 during a component swap operation, with the deflectable dividers 140 moving in a pivoting-type motion away from the selected peripheral component 122. As depicted, a user may determine a peripheral component that is going to be replaced (i.e., the "selected" peripheral component 122). As briefly described above, if the component swap operation is a hot-swap operation (i.e., the circuit board remains electrically live/active), the user will, according to one embodiment, actuate a switch in order to electrically deactivate (i.e., electrically disconnect) the selected peripheral component 122. If the component swap operation is performed when the computer is powered down, the user will not have to actuate a switch to electrically disconnect the selected peripheral component 122.

Because the dividers 140 are deflectable, when the user inserts his hands into the shroud housing 130 to grasp the selected peripheral component 122, the deflectable dividers 140 are deflected outwards (i.e., towards the adjacent peripheral components 124), thus allowing sufficient room for the user to adequately grasp the selected peripheral component 122 and physically detach it from the circuit board 112. Throughout the present disclosure, the term "displacement motion" refers to the movement of the deflectable dividers away from the selected peripheral component 122.

FIG. 4 shows the deflectable dividers 140 moving in a pivoting-type displacement motion 144. The pivoting nature may be imparted to the deflectable dividers 140 in various ways. In one embodiment, the deflectable dividers 140 have an anchored portion 143 and a moving portion 145. The anchored portion may be secured to the shroud housing 130 and the moving portion 145 may be unattached or at least movably attached to the shroud housing 130. For example, in one embodiment there is a scored portion (not pictured) between the anchored portion 143 and the moving portion 145 of the deflectable dividers 140. The deflectable dividers 140 may bend/flex about the scored portion 141, thus allowing the dividers to deflect in the pivoting-type displacement motion 144.

In another embodiment, the pivoting-type displacement motion 144 may be achieved using a pin-in-hinge assembly. In such an embodiment, the anchored portion 143 may include a pin or cylindrical protrusion that is received by a corresponding indentation or bore in the shroud housing 130 (or vice versa). The pivoting engagement between the pin and the indentation may allow the deflectable dividers to pivot. It is expected that those with ordinary skill in the art will recognize others mechanisms, structures, and assemblies that may be employed to facilitate the displacement motion 144.

In one embodiment, as briefly described above, the deflectable dividers 140 may include a protective feature, such as a padding, a textile strip, or a cushion, among others, that prevents, or at least reduces, any damage that may occur when the deflectable dividers 140 around the selected peripheral component 122 move in the displacement direction and impact the adjacent peripheral components 124. In another embodiment, the shroud housing 130 may also include stopper tabs 132 that limit the displacement motion of the deflectable dividers 140, thus preventing the deflectable dividers from impacting the adjacent peripheral components 124. It is expected that other mechanisms, structures, and assemblies may be employed to limit the displacement motion 144, as recognized by those of ordinary skill in the art.

Figure 5:
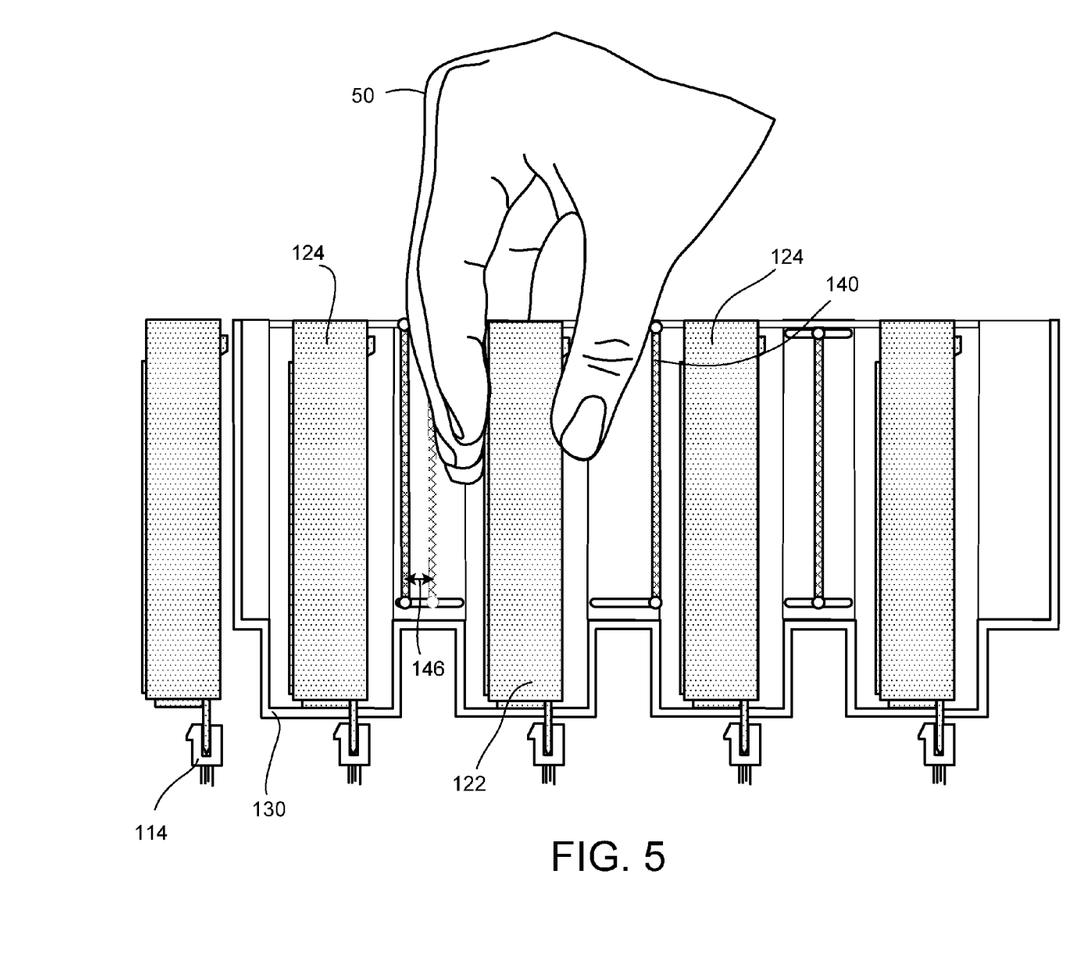
FIG. 5 is a cross-sectional side view of one embodiment of a hand of a user grasping a selected peripheral component during a component swap operation, with the deflectable dividers moving in a translating-type motion.

FIG. 5 is a cross-sectional side view of one embodiment of a hand and fingers 50 of a user grasping a selected peripheral component 122 during a component swap operation, with the deflectable dividers 140 moving in a translating-type motion 146. In such an embodiment, the deflectable dividers 140 may be movable coupled to the shroud housing 130 so as to be laterally moveable from side to side, thus allowing the fingers 50 of a user to displace the dividers 140 in a lateral displacement motion 146. For example, the shroud housing 130 may have grooves or slots that receive corresponding tabs, pins, or other protrusions on the deflectable dividers 140. Accordingly, the deflectable dividers 140 may be controllably slid back and forth in the grooves to create more space around the selected peripheral component 122 for removal/installation. It is expected that other translating-type structures/configurations may be employed to impart the translating-type displacement motion 146 to the deflectable dividers 140.

In one embodiment, the component swap operation may be performed via an automated procedure. For example, a robotic arm or other automated element may be used to grasp the selected peripheral component 122 and a control system may be implemented to control the movement and operation of the automated elements. Further, in one embodiment, the deflectable dividers 140 may be actively displaced instead of passively deflected by a user's fingers. For example, a control system may be implemented with various control modules to actively regulate the displacement motion of the deflectable dividers 140.

In one implementation, the at least one deflectable divider includes a protective material that reduces damage to adjacent peripheral components during the component swap operation. In another implementation, the at least one deflectable divider includes an electrically insulating material that inhibits electrical shorts between the at least one deflectable divider and an adjacent peripheral component during the component swap operation. Also, the at least one deflectable divider may include an anchored portion and a moving portion, where the displacement motion is a pivoting-type motion.

For example, the at least one deflectable divider may have a scored portion between the anchored portion and the moving portion to allow the moving portion to flex/bend about the scored portion. In another example the anchored portion of the at least one deflectable divider has a hinge assembly and the moving portion rotates about the hinge assembly. In yet another implementation, the at least one deflectable divider is deflectably mounted to the shroud housing via translational means so that the displacement motion is a translating-type motion. Further, the shroud housing may include at least one stopper tab that restricts the displacement motion of the at least one deflectable divider.

A system with deflectable dividers separating peripheral components is disclosed. The system includes a computer that includes a circuit board that has electrical connectors and a plurality of peripheral components electrically connected to the circuit board via the electrical connectors. The system further includes a shroud housing coupled to the circuit board, and at least one deflectable divider that is deflectably mounted to the shroud housing. The shroud housing supports the plurality of peripheral components and facilitates a proper electrical connection between the plurality of peripheral components and the circuit board. The at least one deflectable divider is disposed between adjacent peripheral components and the at least one deflectable divider is operably displaced away from a selected peripheral component in a displacement motion by fingers of a user during a component swap operation to allow space for the fingers of the user to grasp the selected peripheral component.

In one implementation, the circuit board is electrically live during the component swap operation. In such an implementation, the shroud housing may include electrical switches for electrically deactivating the selected peripheral component. The peripheral components, in one implementation, are PCI-E cards. The at least one deflectable divider may have an anchored portion and a moving portion and the displacement motion may be a pivoting-type motion. In another implementation, the at least one deflectable divider is deflectably mounted to the shroud housing via translational means, thus allowing the displacement motion to be a translating-type motion.

Figure 6:
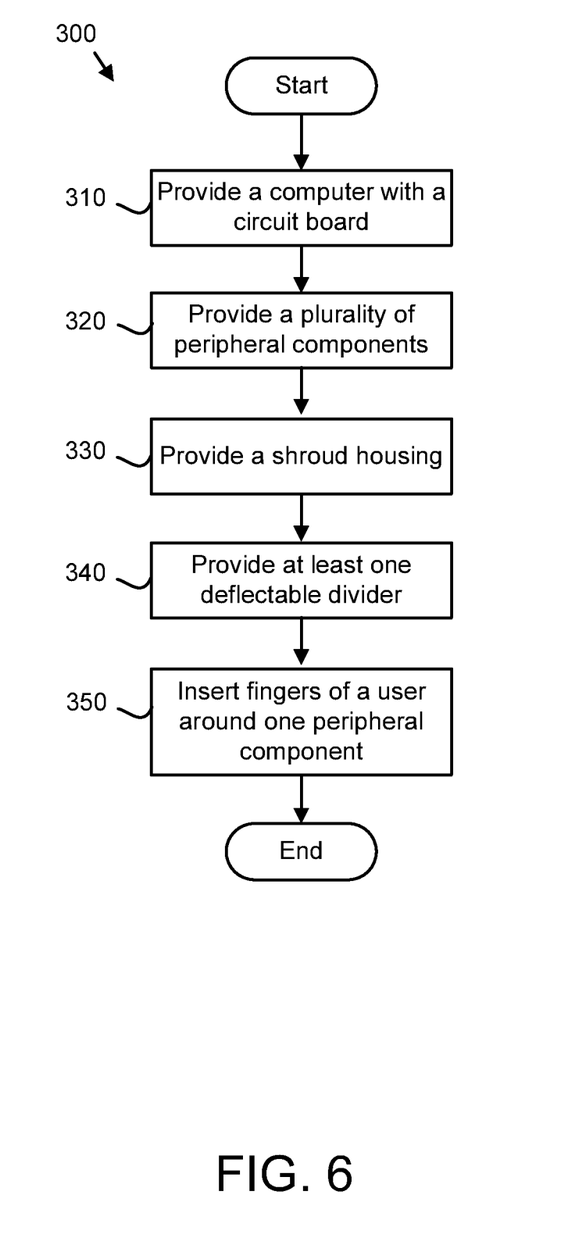
FIG. 6 is a schematic flowchart diagram of one embodiment of a method for swapping peripheral components electrically connected to a circuit board.

FIG. 6 is a schematic flowchart diagram of one embodiment of a method 300 for swapping peripheral components electrically connected to a circuit board. The method 300 includes providing 310 a computer that has a circuit board with electrical connectors and providing 320 a plurality of peripheral components electrically connected to the circuit board via the electrical connectors. The method also includes providing 330 a shroud housing coupled to the circuit board and providing 340 at least one deflectable divider that is deflectably mounted to the shroud housing. The shroud housing supports the plurality of peripheral components and facilitates a proper electrical connection between the plurality of peripheral components and the circuit board and the at least one deflectable divider is disposed between adjacent peripheral components.

The method further includes inserting 350 fingers of a user around a selected peripheral component to grasp the selected component. While inserting the fingers, the at least one deflectable divider is displaced away from the selected peripheral component in a displacement motion by the fingers of the user. In one implementation, the method further includes replacing the selected peripheral component with a different peripheral component. In another implementation, the circuit board is electrically live while inserting the fingers of the user around the selected peripheral component. The method may further include electrically deactivating the selected peripheral component before inserting the fingers of the user around the selected peripheral component.

In yet another implementation, the at least one deflectable divider includes an anchored portion and a moving portion and the displacement motion is a pivoting-type motion. In another implementation, the at least one deflectable divider is deflectably mounted to the shroud housing via translational means and the displacement motion is a translating-type motion.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a shroud housing coupleable to a circuit board, wherein in an installed position the shroud housing facilitates a proper electrical connection between peripheral components and the circuit board; and at least one deflectable divider that is deflectably mounted to the shroud housing, wherein, in the installed position, the at least one deflectable divider is disposed between adjacent peripheral components to isolate the adjacent peripheral components from one another within the shroud housing, wherein the at least one deflectable divider is operably displaced away from a selected peripheral component in a displacement motion by fingers of a user during a component swap operation to allow space for the fingers of the user to grasp the selected peripheral component.

2. The apparatus of claim 1, wherein the at least one deflectable divider comprises a protective material that reduces damage to adjacent peripheral components during the component swap operation.

3. The apparatus of claim 1, wherein the at least one deflectable divider comprises an electrically insulating material that inhibits electrical shorts between the at least one deflectable divider and an adjacent peripheral component during the component swap operation.

4. The apparatus of claim 1, wherein the at least one deflectable divider comprises an anchored portion and a moving portion, wherein the displacement motion is a pivoting-type motion.

5. The apparatus of claim 4, wherein the at least one deflectable divider comprises a scored portion between the anchored portion and the moving portion, wherein the moving portion flexes about the scored portion.

6. The apparatus of claim 4, wherein the anchored portion of the at least one deflectable divider comprises a hinge assembly and the moving portion rotates about the hinge assembly.

7. The apparatus of claim 1, wherein the at least one deflectable divider is deflectably mounted to the shroud housing via translational means, wherein the displacement motion is a translating-type motion.

8. The apparatus of claim 1, wherein the shroud housing comprises at least one stopper tab that restricts the displacement motion of the at least one deflectable divider.

9. A system comprising:
a computer comprising a circuit board, wherein the circuit board comprises electrical connectors;
a plurality of peripheral components electrically connected to the circuit board via the electrical connectors;
a shroud housing coupled to the circuit board, wherein the shroud housing supports the plurality of peripheral components and facilitates a proper electrical connection between the plurality of peripheral components and the circuit board; and
at least one deflectable divider that is deflectably mounted to the shroud housing, wherein the at least one deflectable divider is disposed between adjacent peripheral components to isolate the adjacent peripheral components from one another within the shroud housing, wherein the at least one deflectable divider is operably displaced away from a selected peripheral component in a displacement motion by fingers of a user during a component swap operation to allow space for the fingers of the user to grasp the selected peripheral component.

10. The system of claim 9, wherein the circuit board is electrically live during the component swap operation.

11. The system of claim 10, wherein the shroud housing comprises electrical switches for electrically deactivating the selected peripheral component.

12. The system of claim 9, wherein the plurality of peripheral components are PCI-E cards.

13. The system of claim 9, wherein the at least one deflectable divider comprises an anchored portion and a moving portion, wherein the displacement motion is a pivoting-type motion.

14. The system of claim 9, wherein the at least one deflectable divider is deflectably mounted to the shroud housing via translational means, wherein the displacement motion is a translating-type motion.

15. A method comprising:
providing a computer comprising a circuit board, wherein the circuit board comprises electrical connectors;
providing a plurality of peripheral components electrically connected to the circuit board via the electrical connectors;
providing a shroud housing coupled to the circuit board, wherein the shroud housing supports the plurality of peripheral components and facilitates a proper electrical connection between the plurality of peripheral components and the circuit board;
providing at least one deflectable divider that is deflectably mounted to the shroud housing, wherein the at least one deflectable divider is disposed between adjacent peripheral components to isolate the adjacent peripheral components from one another within the shroud housing; and
inserting fingers of a user around a selected peripheral component to grasp the selected component, wherein the at least one deflectable divider is displaced away from the selected peripheral component in a displacement motion by the fingers of the user.

16. The method of claim 15, further comprising replacing the selected peripheral component with a different peripheral component.

17. The method of claim 15, wherein the circuit board is electrically live while inserting the fingers of the user around the selected peripheral component.

18. The method of claim 17, further comprising electrically deactivating the selected peripheral component before inserting the fingers of the user around the selected peripheral component.

19. The method of claim 15, wherein the at least one deflectable divider comprises an anchored portion and a moving portion, wherein the displacement motion is a pivoting-type motion.

20. The method of claim 15, wherein the at least one deflectable divider is deflectably mounted to the shroud housing via translational means, wherein the displacement motion is a translating-type motion.

\* \* \* \* \*